UNITED STATES PATENT OFFICE.

GEORGE T. LEWIS, OF PHILADELPHIA, PENNSYLVANIA, AND CARL V. PETRAEUS, OF CAMDEN, NEW JERSEY, ASSIGNORS TO THE WESTERN PATENT COMPANY, OF DENVER, COLORADO.

PROCESS OF TREATING SULPHIDE ORES.

SPECIFICATION forming part of Letters Patent No. 481,500, dated August 23, 1892.

Application filed June 27, 1889. Renewed January 12, 1892. Serial No. 417,794. (No specimens.)

*To all whom it may concern:*

Be it known that we, GEORGE T. LEWIS, a resident of the city and county of Philadelphia, State of Pennsylvania, and CARL V. PETRAEUS, a resident of the city and county of Camden, State of New Jersey, citizens of the United States, have invented a new and useful Process for the Treatment of Sulphide Ores Containing Lead and Zinc, Either With or Without Precious Metals, of which the following is a specification.

Our process consists in volatilizing the zinc-lead ores by treating them in a Wetherill zinc-furnace or in a low-cupola furnace or by blowing into a gas-flame, the general principle being to expose the crushed or finely-powdered ore to the joint action of heat and a current of air, whereby the sulphide ore is changed into fumes. In this manner the greater part of the lead and zinc pass off with the draft, carrying off a portion or all of the precious metals. If the ore contains a tolerably-large amount of precious metals, where the ore is volatilized on a solid coal-fire parts of these precious metals will remain in the slag formed. The fumes produced, as before described, together with the gases containing a considerable amount of gaseous sulphurous acid, are passed into a stack or tower or a series of stacks or towers, the stacks or towers being packed with flint, porous bricks or other similar material which will not be attacked by the acid and upon which the fumes will condense, preferably being packed with coke. The fumes are introduced at or near the bottom of the tower by a pump or a positive blower, which sucks the fumes from the furnace through cooling sheet-iron flues and then forces them into the tower. Through the towers at the same time a rain of water is run down from the top. This water will act on the condensed fumes and dissolve the sulphurous acid and combine it with any free oxides in the solid lead and zinc fumes and produce a pulpy mass, which is drawn off. The pulp leaving the flue consists now in soluble zinc sulphite and zinc sulphate in solution, together with insoluble lead salts and insoluble precious matter. As the zinc solution which leaves the stack on the first operation is rather dilute, I prefer to run the pulp through a filter-pump and use this solution so obtained again in the stack instead of water until it becomes concentrated enough. The soluble zinc salts are now separated from the lead salts by filtration, pressing, or other means. The lead salts containing the precious metals are smelted over in a cupola-furnace or other similar furnace, while the zinc solution is kept in contact with a few blocks of zinc for twenty-four hours, as it happens at times that soluble sulphate of silver is formed, which then is precipitated by the zinc. The clear zinc solution is evaporated to dryness and roasted, or it may be treated with a solution of an alkali or alkaline carbonate. This material is then smelted down and metallic zinc is formed. Where the slag from the sublimation of the raw ore contains silver, it may be added to the lead compounds and may be smelted with these.

Having thus described our process, we claim—

The process of treating sulphide ores of lead and zinc, whether containing precious metals or not, which consists in driving off the volatile constituents of the ore and condensing the fumes by passing them through a stack or tower or a series of stacks or towers containing a material—such as coke—which is not acted upon by acid and upon which the fumes will condense and passing a shower of water through said stack and then separating the lead and zinc salts produced and treating each separately, substantially as and for the purpose described.

In testimony of which invention we have hereunto set our hands, at Philadelphia, State of Pennsylvania, this 5th day of June, A. D. 1889.

GEORGE T. LEWIS.
CARL V. PETRAEUS.

Witnesses:
H. B. RIANHARD,
ABNER J. DAVIS.